(12) United States Patent
Tsuya

(10) Patent No.: US 8,237,994 B2
(45) Date of Patent: Aug. 7, 2012

(54) INFORMATION PROCESSING APPARATUS AND INFORMATION PROCESSING PROGRAM

(75) Inventor: Seiji Tsuya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 805 days.

(21) Appl. No.: 12/164,947

(22) Filed: Jun. 30, 2008

(65) Prior Publication Data

US 2009/0002772 A1 Jan. 1, 2009

(30) Foreign Application Priority Data

Jun. 30, 2007 (JP) ................................. 2007-173579

(51) Int. Cl.
H04N 1/00 (2006.01)

(52) U.S. Cl. .......................... 358/404; 358/442; 358/468

(58) Field of Classification Search .................. 358/1.15, 358/1.18, 404, 442, 448, 451, 468; 709/218, 709/246
See application file for complete search history.

(56) References Cited

U.S. PATENT DOCUMENTS

| | | | |
|---|---|---|---|
| 7,262,887 B2 * | 8/2007 | Kamiyama et al. | 358/1.18 |
| 7,443,532 B2 * | 10/2008 | Kamiyama et al. | 358/1.15 |
| 7,548,921 B1 * | 6/2009 | Sharkey et al. | 709/201 |
| 7,710,599 B2 * | 5/2010 | Miyamoto et al. | 358/448 |
| 2002/0156923 A1 * | 10/2002 | Tanimoto | 709/246 |
| 2004/0080768 A1 * | 4/2004 | Larson | 358/1.13 |
| 2004/0190045 A1 * | 9/2004 | Matsuhara et al. | 358/1.15 |
| 2004/0190074 A1 | 9/2004 | Kato | |
| 2004/0246762 A1 | 12/2004 | Inada | |
| 2004/0263890 A1 * | 12/2004 | Kawamoto et al. | 358/1.13 |
| 2005/0036034 A1 * | 2/2005 | Rea et al. | 348/207.1 |
| 2005/0052697 A1 * | 3/2005 | Kamiyama et al. | 358/1.15 |
| 2005/0234914 A1 * | 10/2005 | Ishii et al. | 707/10 |
| 2006/0132833 A1 * | 6/2006 | Terabe et al. | 358/1.15 |
| 2006/0209353 A1 * | 9/2006 | Harada et al. | 358/448 |
| 2006/0215204 A1 * | 9/2006 | Miyamoto et al. | 358/1.15 |
| 2006/0221367 A1 * | 10/2006 | Shiokawa | 358/1.15 |
| 2006/0274367 A1 * | 12/2006 | Yamamoto et al. | 358/1.15 |
| 2007/0263253 A1 * | 11/2007 | Kamiyama et al. | 358/1.15 |
| 2009/0204652 A1 * | 8/2009 | Chikusa et al. | 707/204 |

(Continued)

FOREIGN PATENT DOCUMENTS

JP H06-350790 A 12/1994

(Continued)

OTHER PUBLICATIONS

Japan Patent Office; Notification of Reasons for Refusal in Japanese Patent Application No. 2007-173579 (counterpart to the above-captioned U.S. patent application) mailed Jun. 18, 2009.

*Primary Examiner* — Kimberly A Williams

(74) *Attorney, Agent, or Firm* — Baker Botts L.L.P.

(57) ABSTRACT

An information processing apparatus is provided. The information processing apparatus has a facsimile function of transmitting data to an external apparatus and is capable of communicating with a terminal through a network. The information processing apparatus includes a storage unit which stores data; a detection unit which detects whether the data stored in the storage unit has a specific format; a transmission data generation unit which is configured to generate transmission data to be transmitted to an external apparatus based on the data; and a transmission unit which is configured to transmit the transmission data to the external apparatus using the facsimile function.

11 Claims, 9 Drawing Sheets

U.S. PATENT DOCUMENTS

2010/0165375 A1* 7/2010 Miyamoto et al. ........... 358/1.13
2010/0268929 A1* 10/2010 Tezuka ......................... 713/100

FOREIGN PATENT DOCUMENTS

| JP | H08-102813 A | 4/1996 |
| --- | --- | --- |
| JP | H09-065099 A | 3/1997 |
| JP | H10-126539 A | 5/1998 |
| JP | 2004302658 A | 10/2004 |
| JP | 2004304320 A | 10/2004 |
| JP | 2005-198231 A | 7/2005 |
| JP | 2005-301809 A | 10/2005 |
| JP | 2007-019836 A | 1/2007 |
| JP | 2007-036993 A | 2/2007 |

* cited by examiner

FIG. 3A

EXAMPLE OF CONTENTS OF TRANSMISSION FILE STORED IN SHARED FILE STORAGE AREA 13a

```
brhorita.txt                                                    ← FILE NAME

FIRST LINE     FAX: 052-824-XXXX ⏎~CR              ]  ← DESTINATION FAX NUMBER
SECOND LINE    Horita Kougyou Mr. HORITA Taro ⏎~CR
THIRD LINE  ⏎~CR                              CR
                         Horita Kiki HORITA Hanako ⏎   ← MAIN BODY
                                      April 1, 2007 ⏎
     ⏎~CR                                           CR
     ⏎~CR
            Thank you for your hospitality. ⏎~CR
     ⏎~CR
            How does the matter of ○○ proceed? ⏎~CR
            Although I think you are busy, ⏎~CR
            I ask you as a favor to call me in a few days. ⏎~CR
     ⏎~CR
LAST LINE          −Period− [EOF]~EOF
```

FIG. 3B

EXAMPLE OF DESCRIPTIONS OF IMAGE DATA DRAWN IN IMAGE DATA MEMORY 13e (0, 0) ⟶ X AXIS DIRECTION

Y AXIS DIRECTION

Horita Kougyou Mr. HORITA Taro

Horita Kiki HORITA Hanako
April 1, 2007

Thank you for your hospitality.

How does the matter of ○○ proceed?
Although I think you are busy,
I ask you as a favor to call me in a few days.

−Period−

(X, Y)

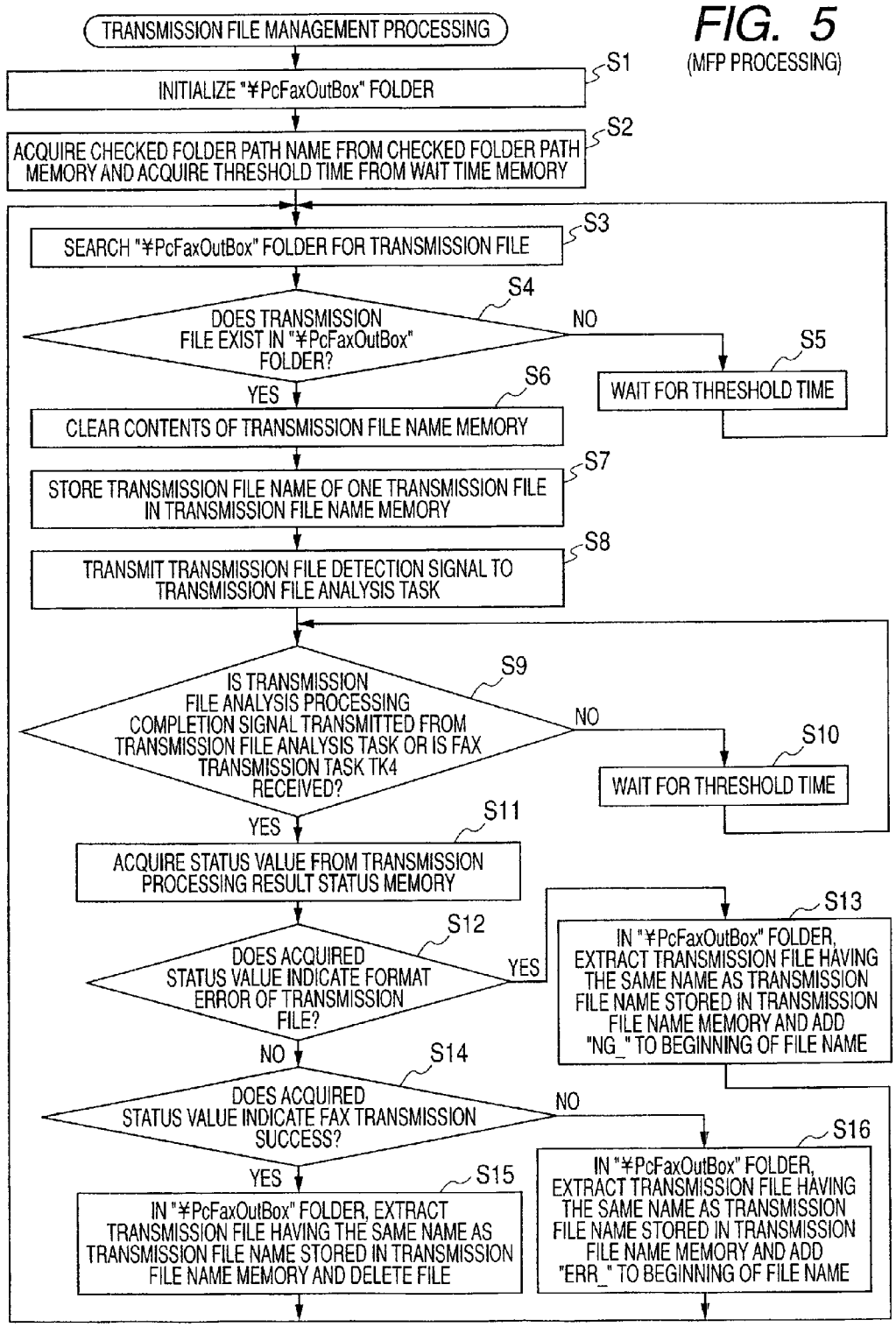
FIG. 5 (MFP PROCESSING)

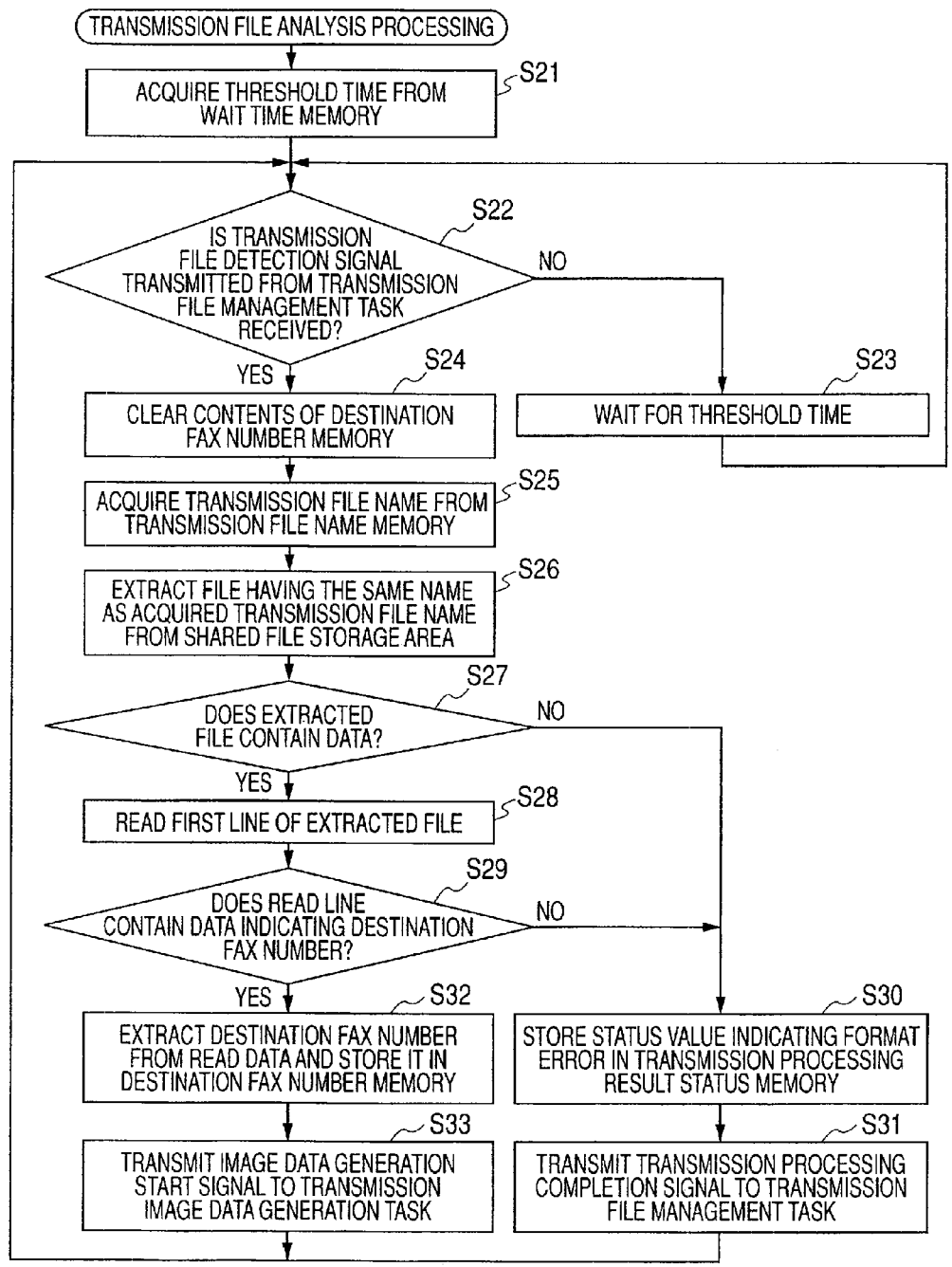

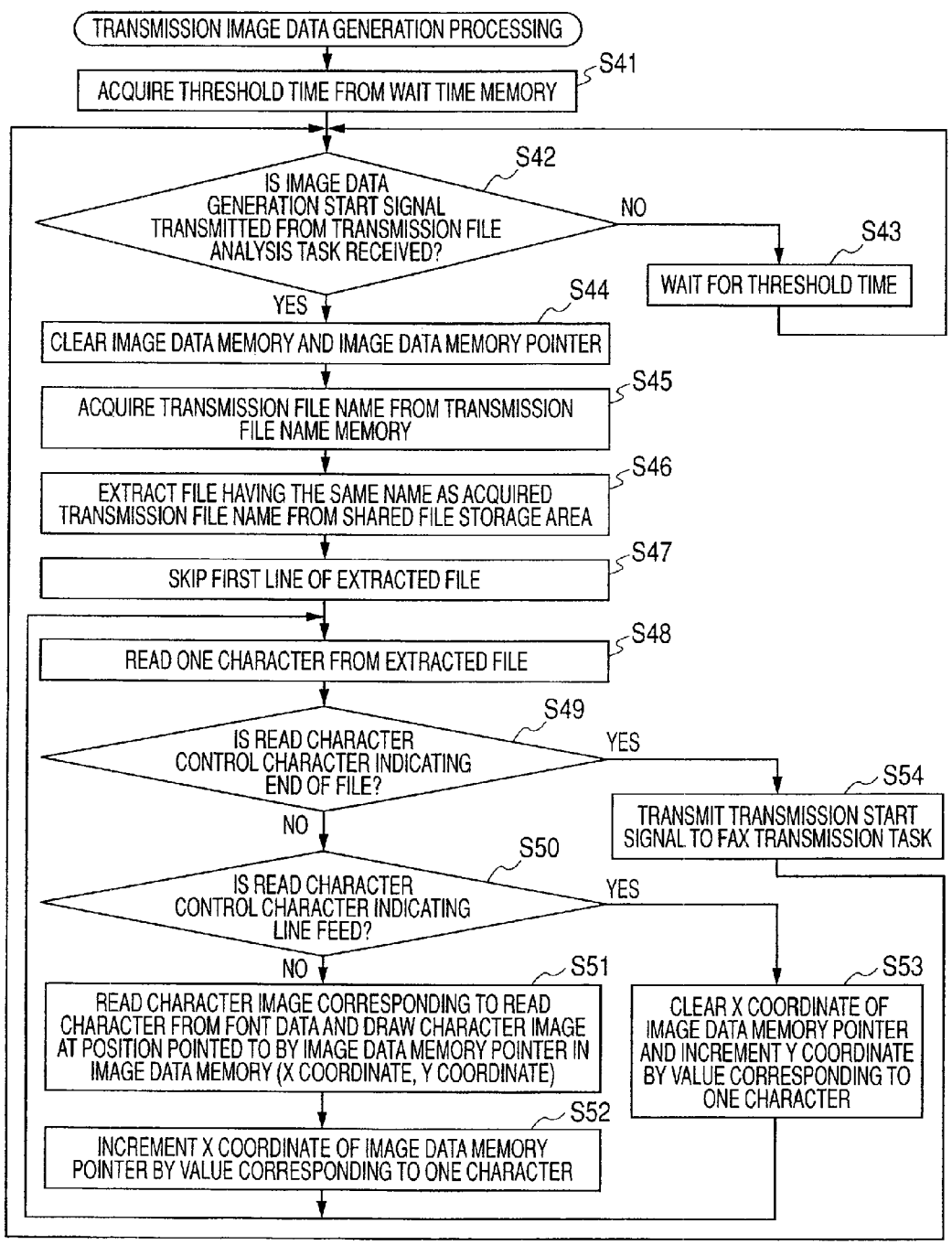

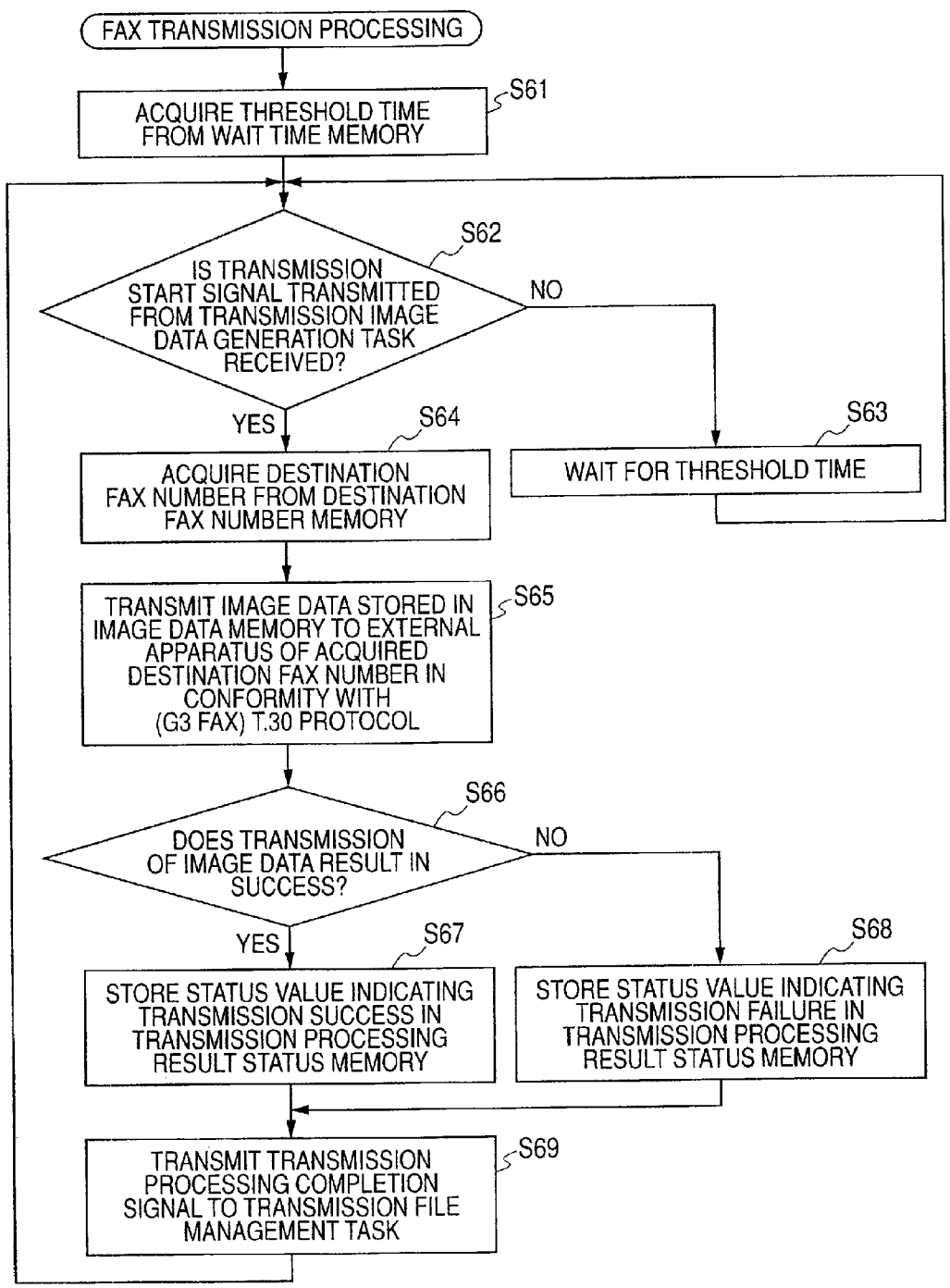

FIG. 9A  EXAMPLE OF SHARED FILE STORAGE AREA 13a REPORTED FROM MFP 1, DISPLAYED ON PC 31

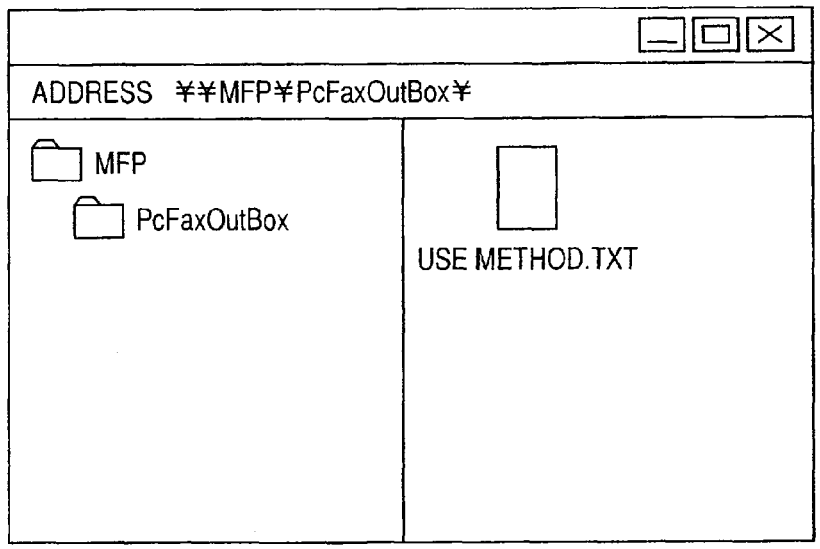

FIG. 9B  EXAMPLE OF CONTENTS OF USE METHOD FILE STORED IN SHARED FILE STORAGE AREA 13a

USE METHOD.TXT

"USE METHOD OF APPARATUS"
STEP 1: ENTER THE DESTINATION TELEPHONE NUMBER AND A CONTROL CHARACTER INDICATING A LINE FEED ON THE FIRST LINE.
STEP 2: ENTER THE MAIN BODY TO BE TRANSMITTED ON THE SECOND AND LATER LINES.
IF YOU ENTER A CONTROL CHARACTER INDICATING A LINE FEED IN THE BEGINNING OF A LINE, A LINE FEED OF THE TEXT IS EXECUTED.
ENTER A CONTROL CHARACTER INDICATING THE END OF THE FILE IN THE END OF THE MAIN BODY.
STEP 3: IF YOU INPUT THE CREATED FILE TO "¥PcFaxOutBox," AN IMAGE IS TRANSMITTED.

THE FOLLOWING IS AN ENTRY EXAMPLE FOR USE AS A MODEL:

First line: FAX: 052-824-XXXX
Second line: Horita Kougyou Mr. HORITA Taro
Third line:
Fourth line:          Horita Kiki HORITA Hanako
Fifth line:           April 1, 2007
Sixth line:
Seventh line: Thank you for your trouble.
Eighth line: Enter text in a similar manner.
Ninth line:           −Period−

INFORMATION PROCESSING APPARATUS AND INFORMATION PROCESSING PROGRAM

CROSS-REFERENCE TO RELATED APPLICATION

This application claims priority from Japanese Patent Application No. 2007-173579, filed on Jun. 30, 2007, the entire subject matter of which is incorporated herein by reference.

TECHNICAL FIELD

Apparatuses and computer program products consistent with the present invention relate to an information processing apparatus and an information processing program, and more particularly, to an information processing apparatus and an information processing program capable of easily transmitting transmission data from a terminal through the information processing apparatus to an external apparatus without installing a new program in the terminal.

BACKGROUND

A related art information processing apparatus, for example, a multifunction device, typically has a plurality of functions such as a facsimile function and a copy function. When the information processing apparatus is connected to a terminal, such as a computer, transmission data to be transmitted using the facsimile function of the information processing apparatus is input from the terminal to the information processing apparatus. The information processing apparatus transmits the input transmission data to an external apparatus through a line, such as a telephone line, that connects the information processing apparatus and the external apparatus. JP-A-2004-304320 describes a related art information processing apparatus that is connected to a terminal by a universal serial bus (USB). Transmission data, e.g., image data, is written from the terminal into a fax transmission folder provided in a virtual drive area set in the related art information processing apparatus via the USB. The related art information processing apparatus recognizes that the transmission data has been written, and transmits the data to the specified destination, i.e., the external apparatus, over the telephone line.

However, the related art information processing apparatus described above has some disadvantages. The related art information processing apparatus is connected to the terminal by the USB, and thus a USB driver program needs to be previously installed in the terminal. Therefore, only a terminal which has the USB driver program installed can use the facsimile function as mentioned above. Thus, there is a problem of poor usability. Accordingly, data cannot be easily written from the terminal into the virtual drive area of the related art information processing apparatus and transmitted simply through the information processing apparatus to the external apparatus by fax.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an information processing apparatus and an information processing program capable of easily transmitting transmission data by facsimile from a terminal through the information processing apparatus to an external apparatus without installing a new program in the terminal.

According to an aspect of the present invention, there is provided an information processing apparatus having a facsimile function of transmitting data to an external apparatus and capable of communicating with a terminal through a network. The information processing apparatus includes a storage unit which stores data from the terminal; a detection unit which detects whether the data stored in the storage unit has a specific format; a transmission data generation unit which is configured to generate transmission data based on the data detected as being data having the specific format; and a transmission unit which is configured to transmit the transmission data to the external apparatus using the facsimile function.

According to another aspect of the present invention, there is provided an information processing apparatus having a facsimile function. The information processing apparatus includes a reception unit which removably receives a storage unit which stores data; a detection unit which detects whether the data stored in the storage unit has a specific format; a transmission data generation unit which is configured to generate transmission data to be transmitted to an external apparatus based on the data detected as being data having the specific format; and a transmission unit which is configured to transmit the transmission data to the external apparatus using the facsimile function.

According to further aspect of the present invention, there is provided a computer-readable medium having a computer program stored thereon that, when executed, performs operations including determining whether data is stored in a specific format; if the data is determined to be stored in the specific format, generating transmission data based on the data; and transmitting the transmission data by facsimile.

According to a still another aspect of the present invention, there is provided an information processing apparatus including a monitoring unit which monitors a target location in a storage unit to find a newly stored file; a reading unit which, in response to a file being found by the monitoring unit, reads a processing command included in the file; and a processing unit which performs processing according to the processing command.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 3A is a schematic drawing to show an example of contents of a transmission file according to an exemplary embodiment of the present invention, and FIG. 3B is an image drawing to show an example of descriptions of image data generated based on the transmission file shown in FIG. 3A;

FIG. 5 is a flowchart showing transmission file management processing of a transmission file management task of FIG. 4;

FIG. 6 is a flowchart showing transmission file analysis processing of a transmission file analysis task of FIG. 4;

FIG. 7 is a flowchart showing transmission image data generation processing of a transmission image data generation task of FIG. 4;

FIG. 8 is a flowchart showing fax transmission processing of a fax transmission task of FIG. 4; and FIGS. 9A and 9B are schematic drawings showing an example of a file indicating a creation procedure of a transmission file.

DETAILED DESCRIPTION

Referring now to the accompanying drawings, exemplary embodiments of the present invention will be described.

Figure 1:
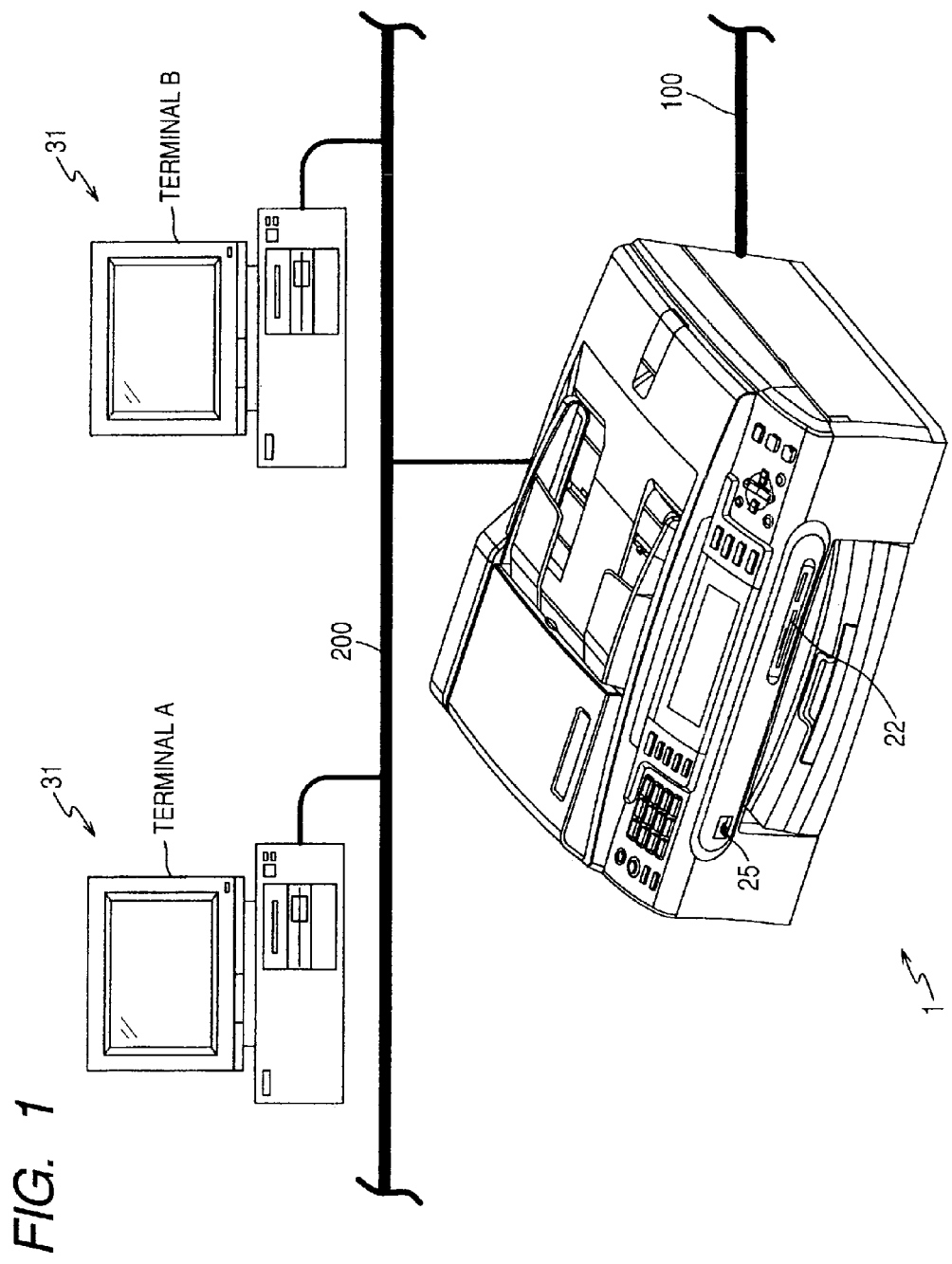
FIG. 1 is a perspective view to show a configuration of an information processing apparatus and terminals according to an exemplary embodiment of the present invention.

FIG. 1 shows a multifunction peripheral (MFP) 1 having an information processing apparatus and personal computers (PCs) 31 as terminals (e.g., terminals A and B). The MFP 1 has various functions of a facsimile function, a printer function, a scanner function, a copy function, etc., and is coupled to a telephone network 100 for transmitting data using the facsimile function.

As shown in FIG. 1, the MFP 1 and the PCs 31 (terminals A and B) are coupled to a local area network (LAN) 200 by LAN interfaces 19 and 36 (see FIG. 2) of the MFP 1 and the PCs 31, respectively, and can conduct data communications with each other through the LAN 200.

The MFP 1 is provided with a shared file storage area 13a (see FIG. 2) that can be referenced through the LAN 200 from the PCs 31 (terminals A and B). A text file is created in a specific format (which will be hereinafter referred to as "transmission file") in the PC 31 (terminal A, B). The transmission file is input into the shared file storage area 13a of the MFP 1, whereby image data generated based on the transmission file can be transmitted to an external apparatus connected through the telephone network 100 using the facsimile function of the MFP 1.

A memory card slot 22 for inserting a memory card 22a (see FIG. 2) is provided on the front of the MFP 1. If the memory card 22a is inserted into the memory card slot 22, a file stored on the memory card 22a can be read. For example, the memory card 22a may be a compact flash (registered trademark), a smart media (registered trademark), a memory stick (registered trademark), an SD card (registered trademark), etc., or the like.

Figure 2:
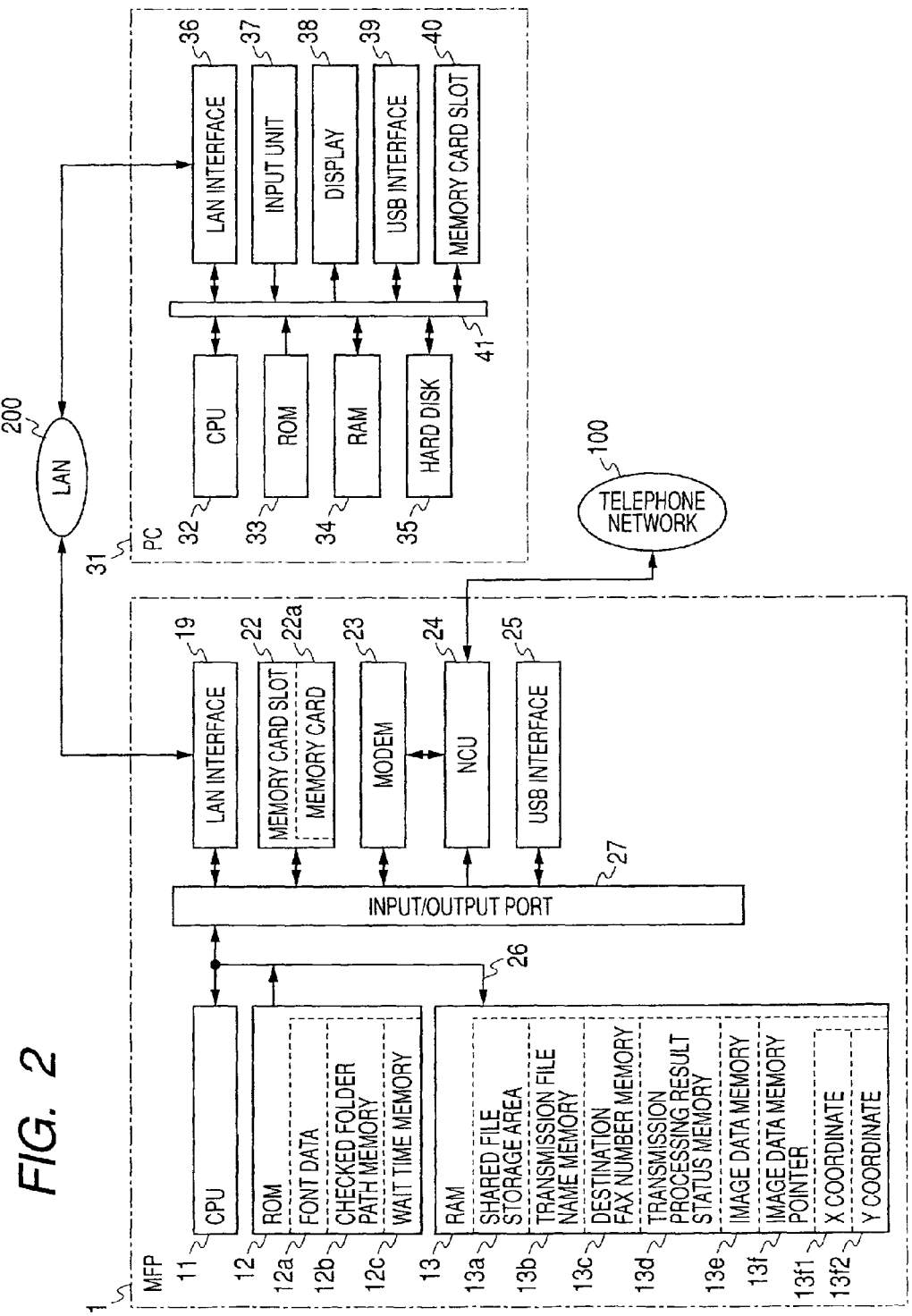
FIG. 2 is a block diagram showing an electric configuration of the information processing apparatus and terminal of FIG. 1.

Next, the electric configuration of the MFP 1 will be discussed with reference to FIG. 2.

The MFP 1 comprises a central processing unit (CPU) 11, a read-only memory (ROM) 12, a random access memory (RAM) 13, the above-mentioned LAN interface 19, the above-mentioned memory card slot 22, a modem 23, an network control unit (NCU) 24, and a USB interface 25. The CPU 11, the ROM 12, and the RAM 13 are coupled together through a bus line 26. The LAN interface 19, the memory card slot 22, the modem 23, the NCU 24, and the bus line 26 are coupled together through an input/output port 27.

The CPU 11 of the MFP 1 controls units coupled to the input/output port 27 in accordance with fixed values and programs stored in the ROM 12 and the RAM 13, or the functions of the MFP 1 and various signals transmitted and received through the LAN interface 19.

The ROM 12 stores a control program, etc., executed in the MFP 1 and information processing programs shown in flowcharts of FIGS. 5 to 7.

The ROM 12 comprises font data memory 12a, a checked folder path memory 12b, and a wait time memory 12c. The font data memory 12a stores font data 12a in which an image in a bit map format indicating the shape of a character corresponding to character data of one character (which will be hereinafter referred to as a "character image") for each character data piece. The checked folder path memory 12b stores a folder name of each folder to be checked as to whether or not a transmission file has been written thereinto, and the wait time memory 12c stores a threshold time after which a standby mode is entered. In the font data memory 12a, for example, the character image corresponding to one character data piece is stored for each character data piece as an image in a bit map format, e.g., a format of 24 dots by 24 dots. For example, a folder name of "¥PcFaxOutBox" is stored in the checked folder path memory 12b. For example, a numeric value of "30 (sec)" is stored in the wait time memory 12c.

The RAM 13 is, for example, a rewritable volatile memory for temporarily storing various pieces of data during execution of the operation of the MFP 1. The RAM 13 comprises a shred file storage area 13a, a transmission file name memory 13b, a destination fax number memory 13c, a transmission processing result status memory 13d, an image data memory 13e, and an image data memory pointer 13f. The shared file storage area 13a can be read and written through the LAN 200 from the PCs 31 (terminals A and B), and stores a transmission file that is input from the PC 31. The transmission file name memory 13b stores the file name of a transmission file on which image data to be generated is based when the image data to be transmitted to an external apparatus by fax is generated. The destination fax number memory 13c stores the fax number of an external apparatus to which the image data is to be transmitted. The transmission processing result status memory 13d stores a status value indicating a result of transmission processing for transmitting image data to an external apparatus. The image data memory 13e generates image data based on character data contained in a transmission file, and the image data memory pointer 13f points to a position in the image data memory 13e.

The shared file storage area 13a is recognized as external storage by the PCs 31 (terminals A and B) coupled to the LAN 200. That is, each of the PCs 31 (terminals A and B) recognizes the shared file storage area 13a as a peripheral (external storage) coupled to the PC 31. In this exemplary embodiment, for example, a folder having the folder name "PcFaxOutBox" is provided in the shared file storage area 13a and is also recognized by the PCs 31. Transmission data from the PCs 31 is stored in the "¥PcFaxOutBox" folder in processing described later.

The mechanism for recognizing the shared file storage area 13a as external storage will be briefly discussed. In this exemplary embodiment, the shared file storage area 13a exists in the RAM 13 of the MFP 1. In such a case, a built-in file system as a function of an operating system (OS) such as Windows (registered trademark) is used, and an inquiry about a shared file storage area can be sent to various machines connected through a network. The protocol used is, for example, a file share type protocol, for example a server management block/common internet file system (SMB/CIFS) type or Samba type protocol used in Windows is applied. SMB/CIFS is a protocol for realizing file sharing and printer sharing through a network.

If a command of inquiry about a shared file storage area is sent in accordance with the protocol from the file system of the PC 31, the shared file storage area 13*a* in the RAM 13 is returned as a shared file storage area in the file system of the MFP 1. That is, the MFP 1 sends information for identifying the shared file storage area 13*a* to the PC 31. Further, if an inquiry command about folder information in the shared file storage area 13*a* is sent from the PC 31, the MFP 1 sends the above-mentioned "¥PcFaxOutBox" folder to the PC 31 as a folder list.

Upon reception of information of the shared file storage area 13*a* and further the folder information, the PC 31 can display the folder as an icon on a display screen by an OS function (see FIG. 9A). If the icon is double clicked on the display screen, the PC 31 sends an inquiry command about file information stored in the folder to the MFP 31. Since the MFP 31 sends a file list stored in the folder to the PC 31 in response to the inquiry command, the PC 31 can display each file as an icon on the display screen (see FIG. 9A). In contrast, a file is stored in the "¥PcFaxOutBox" folder on the display screen of the PC 31, whereby the file can be easily stored in the shared file storage area 13*a* of the MFP 1 from the PC 31. Since such file storage is also accomplished according to the above-mentioned protocol, a special program is not required.

Thus, the PCs 31 (terminals A and B) recognize the shared file storage area 13*a* and further various folders provided therein as external storage through the LAN 200, so that no new programs such as a driver program, a control program, etc., are needed to be installed in the PC 31 (terminal A, B). Accordingly, the usability is improved. For example, it is assumed that the USB interface 25 of the MFP 1 and a USB interface 39 of the PC 31 (terminal A, B) are coupled together by a USB cable. In this case, the PC 31 (terminal A, B) cannot recognize the shared file storage area 13*a* as external storage unless a USB driver program is installed in the PC 31 (terminal A, B).

The status value indicating the transmission processing result is stored in the transmission processing result status memory 13*d*. For example, if the predetermined format of a transmission file is erroneous (format error), "1" is stored; if image data cannot be transmitted to an external apparatus, "2" is stored; if image data is normally transmitted to an external apparatus, "0" is stored.

The image data memory 13*e* is memory for drawing a character image corresponding to character data based on the character data contained in a transmission file to generate image data. Image data in the bit map format shaped like a rectangle with the origin as (0, 0) and the apex diagonal to the origin (X, Y) can be generated in the image data memory 13*e* (see FIG. 3B). Dots are used as coordinate value units.

The image data memory pointer 13*f* is provided with an X coordinate 13*f*1 for storing the coordinate position in the X axis direction and a Y coordinate 13*f*2 for storing the coordinate position in the Y axis direction when a character image of 24 dots by 24 dots is drawn in the image data memory 13*e*.

The LAN interface 19 is a known circuit for making it possible to conduct data communications with various apparatuses and devices coupled to the LAN 200 by connecting one end of a LAN cable to the connection port of the LAN interface 19 and an opposite end to the LAN 200.

The modem 23 modulates image data stored in the image data memory 13*e* into a signal that can be transmitted to the telephone network 100 based on a command from the CPU 11 and transmits the signal through the NCU 24 and also receives a signal input through the NCU 24 from the telephone network 100 and demodulates the signal into image data. The modem 23 is classified into a group called G3 in the facsimile type and can transmit and receive image data in conformity with T.30 protocol if the modem is coupled through the telephone network 100 to a facsimile machine falling into the G3 group. The NCU 24 is coupled to the telephone network 100 and controls sending a dialing signal to the telephone network 100, responding to a ringing signal from the telephone network 100, etc., in a telephone call function.

Next, the electric configuration of the PC 31 will be discussed. The PC 31 comprises a CPU 32, ROM 33, RAM 34, a hard disk 35, a LAN interface 36, an input unit 37, a display 38, a USB interface 39, and a memory card slot 40, which are connected to each other through a bus line 41.

The CPU 32 controls the units coupled by the bus line 41 in accordance with fixed values and programs stored in the ROM 33, the RAM 34, and the hard disk 35, or the functions of the PC 31 and various signals transmitted and received through the LAN interface 36.

The ROM 33 stores various control programs executed in the PC 31. The RAM 34 is rewritable memory for temporarily storing various pieces of data. The hard disk 35 is rewritable nonvolatile storage. The data stored on the hard disk 35 is retained after power of the PC 31 is turned off. An operating system (OS) and text file creation software, etc., included with the OS are stored on the hard disk 35. The text file creation software is used to create a transmission file of a text file in a specific format to transmit data by the facsimile function without installing new software in the PC 31 and thus enjoys good usability. The specific format is described later.

The LAN interface 36 is a known circuit for making it possible to conduct data communications with various apparatuses and devices that are coupled to the LAN 200 by connecting one end of a LAN cable to the connection port of the LAN interface 36 and an opposite end to the LAN 200.

The input unit 37 is used for managing the PC 31 and using the text file creation software stored on the hard disk 35. For example, the input unit 37 may be implemented as an input unit of a keyboard, a mouse, etc. The display 37 is used for managing the PC 31 and using the text file creation software; for example, and is implemented as a display of a liquid crystal display, etc.

The USB interface 39 enables the PC 31 and various apparatuses and devices to conduct data communications with each other through a USB cable by connecting one end of the USB cable to the connection port of the USB interface 39 and an opposite end to the connection port of the USB interface provided in each of various apparatuses and devices.

When the memory card 22*a* is inserted into the memory card slot 40, the memory card slot 40 allows a transmission file created using the text file creation software to be stored on the memory card 22*a*.

Next, the specific format of a transmission file will be discussed with reference to FIG. 3A.

FIG. 3A is a schematic showing an example of a transmission file and FIG. 3B is an image drawing to show an example of the descriptions of image data generated based on the transmission file shown in FIG. 3A.

The transmission file is a text file formed of character data. For the MFP 1 to determine that the file contains data for facsimile transmission, the transmission file is created in the PC 31 based on a specific format. Specifically, the transmission file comprises a destination fax number and a main body; the destination fax number is described on the first line and the main body is described on the second and later lines. As shown in FIG. 3A, for example, the destination fax number is described like "FAX: 052-824-XXXX" on the first line and a control character CR indicating a line feed is described at the end of the line.

Text to be transmitted to the external apparatus is described in each of the second and later lines to create the main body. For example, "Horita Kougyou Mr. HORITA Taro" is described on the second line and a control character CR indicating a line feed is described at the end of the line. In this example, four blank (space) characters are described preceding "Horita Kougyou" and one blank (space) character is described between "Horita Kougyou" and "Mr. HORITA Taro." Only a control character CR indicating a line feed may be described at the beginning of the line like the third line shown in FIGS. 3A and 3B. After this, text input and description of a control character CR indicating a line feed are repeated to create the main body. A control character EOF indicating the end of the file is described at the end of the main body.

Although described later in detail, if the transmission file in the format described above is stored in the "¥PcFaxOutBox" folder in the shared file storage area 13a into which data can be written from the PC 31, a transmission image data generation task TK3 (see FIG. 4) generates image data based on the main body of the transmission file. For example, if it is the transmission file shown in FIG. 3A, the image data shown in FIG. 3B is generated.

Next, processing executed by the CPU 11 of the MFP 1 if a transmission file (text file in the specified format) is stored in the "¥PcFaxOutBox" folder in the shared file storage area 13a of the MFP 1 will be discussed with reference to FIG. 4.

Figure 4:
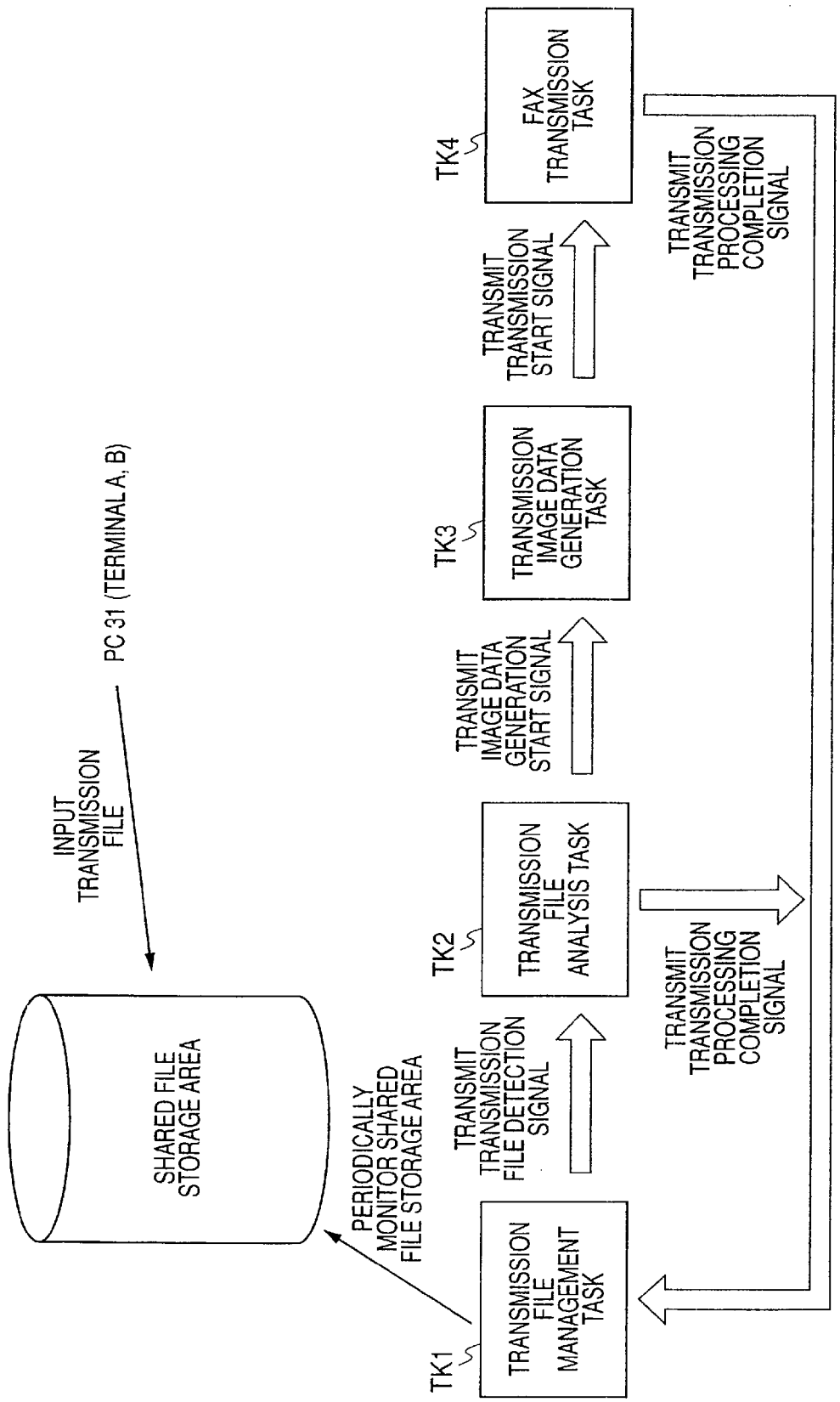
FIG. 4 is a schematic drawing describing an outline of tasks executed by the information processing apparatus of FIG. 1 and signals communicated during the tasks.

FIG. 4 is a schematic drawing describing an outline of various tasks TK1 to TK4 executed by the CPU 11 of the MFP 1 and signals transmitted and received among the various tasks TK1 to TK4.

As shown in FIG. 4, the MFP 1 executes a transmission file management task TK1 for monitoring the transmission file stored in the shared file storage area 13a (in this exemplary embodiment, the "¥PcFaxOutBox" folder), a transmission file analysis task TK2 for extracting the destination fax number from the character data contained in the transmission file detected by the transmission file management task TK1, the above-mentioned transmission image data generation task TK3 for generating image data based on the character data contained in the transmission file detected by the transmission file management task TK1, and a fax transmission task TK4 for transmitting the image data generated by the transmission image data generation task TK3 to the external apparatus specified by the destination fax number. The various tasks TK1 to TK4 are executed concurrently from turning on main power of the MFP 1 to turning off the main power.

The transmission file management task TK1 (see FIG. 5) periodically monitors the "¥PcFaxOutBox" folder in the shared file storage area 13a. For example, the transmission file management task TK1 may check the folder once every certain period of time, such as once every 30 seconds. The monitor location is based on the information stored in the checked folder path memory 12b mentioned above. When a transmission file is stored in the "¥PcFaxOutBox" folder of the MFP 1 through the LAN 200 from the PC 31 (terminal A, B), the transmission file management task TK1 detects the input transmission file, stores the file name of the detected transmission file in the transmission file name memory 13b, and transmits a transmission file detection signal to the transmission file analysis task TK2 (see FIG. 6). Then, the transmission file management task TK1 waits until reception of a transmission processing completion signal transmitted from the transmission file analysis task TK2 or the fax transmission task TK4.

Upon reception of the transmission file detection signal from the transmission file management task TK1, the transmission file analysis task TK2 extracts the destination fax number from the character data contained in the transmission file determined by the file name stored in the transmission file name memory 13b, stores the destination fax number in the destination fax number memory 13c, and transmits an image data generation start signal to the transmission image data generation task TK3 (see FIG. 7). If the transmission file analysis task TK2 cannot extract the destination fax number, the transmission file analysis task TK2 stores a status value indicating a format error (for example, "1") in the transmission processing result status memory 13d and transmits a transmission processing completion signal to the transmission file management task TK1.

Upon reception of the image data generation start signal from the transmission file analysis task TK2, the transmission image data generation task TK3 generates image data in the image data memory 13e based on the character data (main body) contained in the transmission file determined by the file name stored in the transmission file name memory 13b. Upon completion of generating the image data, the transmission image data generation task TK3 transmits a transmission start signal to the fax transmission task TK4 (see FIG. 8).

Upon reception of the transmission start signal from the transmission image data generation task TK3, the fax transmission task TK4 transmits the image data stored in the image data memory 13e to the external apparatus specified by the destination fax number stored in the destination fax number memory 13c, stores a status value indicating the transmission result (for example, if the transmission results in success, "0"; if the transmission results in failure, "2") in the transmission processing result status memory 13d, and transmits a transmission processing completion signal to the transmission file management task TK1. The transmission to the external apparatus is basically similar to the process of specifying the fax number directly at the MFP 1 and transmitting the read image data.

Upon reception of the transmission processing completion signal from the transmission file analysis task TK2 or the fax transmission task TK4, the transmission file management task TK1 manipulates the transmission file determined by the file name stored in the transmission file name memory 13b in accordance with the status value stored in the transmission processing result status memory 13d and restarts monitoring the shared file storage area 13a (in this exemplary embodiment, the "¥PcFaxOutBox" folder).

Next, transmission file management processing of the transmission file management task TK1 executed by the CPU 11 of the MFP 1 will be discussed with reference to FIG. 5. FIG. 5 is a flowchart showing the transmission file management processing of the transmission file management task TK1. The transmission file management processing is started at a time at which the power of the MFP 1 is turned on and the MFP 1 starts. The transmission file management processing is processing for monitoring storage of a transmission file in the "¥PcFaxOutBox" folder in the shared file storage area 13a from the PC 31 and notifying whether or not image data can be transmitted to the external apparatus.

In the transmission file management processing, the shared file storage area 13a is initialized (S1) and the checked folder path name stored in the checked folder path memory 12b is acquired and the threshold time (for example, 30 seconds) stored in the wait time memory 12c is acquired (S2).

The CPU 11 searches the "¥PcFaxOutBox" folder in the shared file storage area 13a for a transmission file (S3) and whether or not a transmission file exists is determined (S4). For example, whether or not a file with file extension "txt" exists is determined. If it is determined that no transmission file exists in the "¥PcFaxOutBox" folder in the shared file storage area 13a (NO at S4), the CPU 11 waits for the threshold time (for example, 30 seconds) (S5) and returns to operation S3 and repeats operations S3 to S5.

On the other hand, if it is determined that a transmission file exists in the "¥PcFaxOutBox" folder in the shared file storage area 13a (YES at S4), the CPU 11 clears the contents of the transmission file name memory 13b (S6), stores the transmission file name of one transmission file stored in the "¥PcFaxOutBox" folder in the transmission file name memory 13b (S7), and transmits a transmission file detection signal to the transmission file analysis task TK2 (S8).

For example, if the transmission file "brhorita.txt" shown in FIG. 3A is input into the "¥PcFaxOutBox" folder in the shared file storage area 13a, the file name "brhorita.txt" is stored in the transmission file name memory 13b.

Whether a transmission processing completion signal transmitted from the transmission file analysis task TK2 or the fax transmission task TK4 is received is determined (S9). If it is determined that no transmission processing completion signal is received (NO at S9), the CPU 11 waits for the threshold time (for example, 30 seconds) (S10) and repeats operations S9 and S10.

On the other hand, if it is determined that a transmission processing completion signal is received (YES at S9), the status value is acquired from the transmission processing result status memory 13d (S11) and whether the acquired status value indicates a format error of the transmission file is determined (S12). If it is determined that the acquired status value indicates a format error of the transmission file (YES at S12), in the shared file storage area 13a, the transmission file having the same name as the transmission file name stored in the transmission file name memory 13b is extracted and, for example, "NG_" as a prefix indicating a format error is added to the beginning of the file name (S13), the process returns to operation S3, and operations S3 to S13 are repeated. For example, if "brhorita.txt" is stored in the transmission file name memory 13b, the file name of the transmission file in the "¥PcFaxOutBox" folder is changed to "NG_brhorita.txt."

On the other hand, if it is determined that the acquired status value does not indicate a format error of the transmission file (NO at S12), whether the acquired status value indicates fax transmission success is determined (S14).

If it is determined that the acquired status value indicates fix transmission success (YES at S14), in the shared file storage area 13a, the transmission file having the same name as the transmission file name stored in the transmission file name memory 13b is extracted and is deleted (S15). That is, if "brhorita.txt" is stored in the transmission file name memory 13b, the transmission file "brhorita.txt" is deleted.

On the other hand, if it is determined that the acquired status value indicates fax transmission failure (NO at S14), in the shared file storage area 13a, the transmission file having the same name as the transmission file name stored in the transmission file name memory 13b is extracted and, for example, "ERR_" as a prefix indicating a transmission error is added to the beginning of the file name (S16). The process returns to operation S3 and operations S3 to S16 are repeated. For example, if "brhorita.txt" is stored in the transmission file name memory 13b, the file name of the transmission file is changed to "ERR_brhorita.txt."

As the transmission file management processing described with reference to the flowchart of FIG. 5 is performed, it is possible to detect the transmission file stored in the "¥PcFaxOutBox" folder in the shared file storage area 13a through the LAN 200 using the PC 31 (terminal A, B). If image data cannot be transmitted to the external apparatus, the character string ("NG_" or "ERR_") indicating the reason why the image data cannot be transmitted is added to the beginning of the file name of the transmission file. Thus, it is easy to recognize the reason why the image data cannot be transmitted and action may be taken to correct the error and transmit the transmission file by performing easy operation of checking the file name of the transmission file stored in the "¥PcFaxOutBox" folder. If image data is transmitted to the external apparatus, the transmission file is deleted. Accordingly, it is easy to understand whether the transmission file has been transmitted by performing easy operation of checking the presence or absence of the transmission file.

Since the transmission data transmitted to the external apparatus is deleted, it is also possible to prevent a condition in which the data stored in the "¥PcFaxOutBox" folder in the shared file storage area 13a exceeds the storable data capacity, thus making it impossible to input a new transmission file. Accordingly, it is possible to use the shared file storage area 13a effectively even when two or more users share the MFP 1.

Next, transmission file analysis processing of the transmission file analysis task TK2 executed by the CPU 11 of the MFP 1 will be discussed with reference to FIG. 6. FIG. 6 is a flowchart showing the transmission file analysis processing of the transmission file analysis task TK2. If the transmission file management task TK1 detects a transmission file, the transmission file analysis processing extracts the destination fax number of the external apparatus to which image data is to be transmitted from the detected transmission file.

In the transmission file analysis processing, the threshold time (for example, 30 seconds) stored in the wait time memory 12c is acquired (S21) and whether a transmission file detection signal transmitted from the transmission file management task TK1 is received is determined (S22). If it is determined that no transmission file detection signal is received (NO at S22), the process waits for the threshold time (for example, 30 seconds) (S23) and returns to operation S22 and operations S22 and S23 are repeated.

On the other hand, if it is determined that a transmission file detection signal is received (YES at S22), the contents of the destination fax number memory 13c are cleared (S24), the transmission file name is acquired from the transmission file name memory 13b (S25), and a file having the same name as the acquired transmission file name is extracted from the shared file storage area 13a (S26).

Next, whether the extracted file contains data is determined (S27). If it is determined that the extracted file contains data (YES at S27), the first line of the extracted file is read (S28) and whether the read line contains data indicating the destination fax number is determined (S29). For example, whether the data is a numeric data list is determined.

If it is determined that the extracted file does not contain data (NO at S27) or if it is determined that the read line does not contain data indicating the destination fax number (NO at S29), a status value indicating a format error (for example, "1") is stored in the transmission processing result status memory 13d (S30), a transmission processing completion signal is transmitted to the transmission file management task TK1 (S31), the process returns to operation S22, and operations S22 to S31 are repeated.

If it is determined that the read line contains data indicating the destination fax number (YES at S29), the destination fax number is extracted from the read data and is stored in the destination fax number memory 13c (S32), an image data generation start signal is transmitted to the transmission image data generation task TK3 (S33), the process returns to operation S22, and operations S22 to S33 are repeated.

For example, if "brhorita.txt" is stored in the transmission file name memory 13b, the first line of the transmission file shown in FIG. 3A is read. Since "FAX: 052-824-XXXX" is described on the first line of the transmission file, the number "052824XXXX" following "FAX:" is extracted as the destination fax number and is stored in the destination fax number memory 13c.

As the transmission file analysis processing described with reference to the flowchart of FIG. 6 is performed, once the transmission file management task TK1 detects a transmission file, the destination fax number of the external apparatus to which image data is to be transmitted can be extracted from the detected transmission file. Therefore, it is possible to transmit the image data to the external apparatus without entering the destination fax number by operating the MFP 1. Accordingly, usability is increased. It is not necessary to install a program in the PC 31 (terminal A, B) for transmitting the destination fax number from the PC 31 (terminal A, B) to the MFP 1 and thus usability is increased.

If the destination fax number cannot be extracted, a status value indicating a format error (for example, "1") is stored in the transmission processing result status memory 13d and is used in operation S13 in the transmission file management processing.

Next, transmission image data generation processing of the transmission image data generation task TK3 executed by the CPU 11 of the MFP 1 will be discussed with reference to FIG. 7. FIG. 7 is a flowchart showing the transmission image data generation processing of the transmission image data generation task TK3. If the transmission file management task TK1 detects a transmission file, the transmission image data generation processing generates image data in the image data memory 13e based on the detected transmission file.

In the transmission image data generation processing, the threshold time (for example, 30 seconds) stored in the wait time memory 12c is acquired (S41) and whether an image data generation start signal transmitted from the transmission file analysis task TK2 is received is determined (S42). If it is determined that no image data generation start signal is received (NO at S42), the process waits for the threshold time (for example, 30 seconds) (S43) and returns to operation S42 and operations S42 and S43 are repeated.

On the other hand, if it is determined that an image data generation start signal is received (YES at S42), the image data memory 13e and the image data memory pointer 13f are cleared (S44) and the transmission file name is acquired from the transmission file name memory 13b (S45). A file having the same name as the acquired transmission file name is extracted from the shared file storage area 13a (S46) and is read and the first line is skipped (S47).

Character data of one character is read from the portion corresponding to the main body in FIG. 3A in the extracted file (S48) and whether the read one-character character data is a control character EOF indicating the end of the file is determined (S49). If it is determined that the read character data is a control character EOF indicating the end of the file (YES at S49), a transmission start signal is transmitted to the fax transmission task TK4 (S54) and the process returns to operation S42 and operations S42 to S54 are repeated.

On the other hand, if it is determined that the read character data is not a control character EOF indicating the end of the file (NO at S49), whether the read character is a control character CR indicating a line feed is determined (S50).

If it is determined that the read character is a control character CR indicating a line feed (YES at S50), the X coordinate 13f1 of the image data memory pointer 13f is cleared and the Y coordinate 13f2 is incremented by a value corresponding to one character (S53). That is, in this exemplary embodiment, the size of a character image corresponding to character data of one character is, for example, 24 dots by 24 dots and therefore 24 dots of the distance in the vertical direction (Y axis direction) as much as one character are added to the Y coordinate 13f2. The process returns to operation S48 and operations S42 to S53 are repeated.

On the other hand, if it is determined that the read character is not a control character CR indicating a line feed (NO at S50), the character image corresponding to the read character is read from the font data 12a and is drawn at the position pointed to by the image data memory pointer 13f in the image data memory 13e (X coordinate value indicated by the X coordinate 13f1, Y coordinate value indicated by the Y coordinate 13f2) (S51). The X coordinate 13f1 of the image data memory pointer 13f is incremented by a value corresponding to one character (e.g., 24 dots) (S52) and the process returns to operation S48 and operations S48 to S52 are repeated.

An example of the image data generated in the image data memory 13e will be discussed. It is assumed that the image data is generated based on the transmission file "brhorita.txt" shown in FIG. 3A. First, the first line in which the fax number of the transmission file is input is skipped and the character data of one character is read from the beginning of the second line of the main body of the transmission file. The character image corresponding to the read character data is read from the font data 12a and is drawn at the position pointed to by the image data memory pointer 13f in the image data memory 13e.

As shown in FIG. 3A, "Horita Kougyou Mr. HORITA Taro" is described on the second line of the transmission file. Four blank (space) characters are described preceding "Horita Kougyou" and one blank (space) character is described between "Horita Kougyou" and "Mr. HORITA Taro" and a control character CR,indicating a line feed is described at the end of the line.

That is, the one character (blank character) at the beginning of the second line of the transmission file is read and the character image corresponding to the blank character is read from the font data 12a. The read character image is drawn at the coordinate position pointed to by the image data memory pointer 13f in the image data memory 13e (X coordinate value indicated by the X coordinate 13f1, Y coordinate value indicated by the Y coordinate 13f2).

At this point in time, the values of the X coordinate 13f1 and the Y coordinate 13f2 are each "0," and thus a character image of 24 dots by 24 dots corresponding to the blank character is drawn at the coordinate position (0, 0) in the image data memory 13e. In the example in FIGS. 3A and 3B, the character image is drawn so that the upper left corner of the character image in the figure matches the coordinate position. Upon completion of drawing the one-character character image, 24 dots of the distance in the horizontal direction (X axis direction) of the character image corresponding to the one character are added to the X coordinate 13f1. After this, likewise, the characters described on the second line are read one character at a time and the character image corresponding to the read character is read from the font data 12a. The read character image is drawn at the coordinate position pointed to by the image data memory pointer 13f in the image data memory 13e and the X coordinate 13f1 is updated.

If a control character CR indicating a line feed described at the end of the line is read, the X coordinate 13f1 is cleared and 24 dots of the distance in the vertical direction (Y axis direction) of the character image corresponding to one character are added to the Y coordinate 13f2. After this, likewise, the characters are read one character at a time in order and the character image corresponding to the read character is read from the font data 12a until a control character EOF indicating the end of the file is read. The read character image is drawn at the coordinate position pointed to by the image data memory pointer 13f in the image data memory 13e. This processing is repeated, whereby the image data shown in FIG. 3B can be generated in the image data memory 13e.

As the transmission image data generation processing described with reference to the flowchart of FIG. 7 is performed, when the transmission file management task TK1 detects a transmission file, image data can be generated in the image data memory 13e based on the detected transmission file.

Next, fax transmission processing of the fax transmission task TK4 executed by the CPU 11 of the MFP 1 will be discussed with reference to FIG. 8. FIG. 8 is a flowchart showing the fax transmission processing of the fax transmission task TK4.

If the transmission image data generation task TK3 generates image data, the fax transmission processing is processing for transmitting the generated image data to the external apparatus specified by the destination fax number extracted by the transmission file analysis task TK2.

In the fax transmission processing, the threshold time (for example, 30 seconds) stored in the wait time memory 12c is acquired (S61) and whether a transmission start signal transmitted from the transmission image data generation task TK3 is received is determined (S62). If it is determined that no transmission start signal is received (NO at S62), the process waits for the threshold time (for example, 30 seconds) (S63) and returns to operation S62 and operations S62 and S63 are repeated.

On the other hand, if it is determined that a transmission start signal is received (YES at S62), the destination fax number is acquired from the destination fax number memory 13c (S64) and the image data stored in the image data memory 13e is transmitted to the external apparatus specified by the acquired destination fax number in conformity with (G3 FAX) T.30 protocol (S65).

Next, whether the transmission of the image data results in success is determined (S66) and if it is determined that the transmission of the image data results in success (YES at S66), a status value indicating the transmission success (for example, "0") is stored in the transmission processing result status memory 13d (S67). On the other hand, if it is determined that the transmission of the image data results in failure (NO at S66), a status value indicating the transmission failure (for example, "2") is stored in the transmission processing result status memory 13d (S68).

A transmission processing completion signal is transmitted to the transmission file management task TK1 (S69) and the process returns to operation S62 and operations S62 to S69 are repeated.

As the fax transmission processing described with reference to the flowchart of FIG. 8 is performed, if the transmission image data generation task TK3 generates image data, the generated image data can be transmitted to the external apparatus specified by the destination fax number extracted by the transmission file analysis task TK2. If it is determined that the image data cannot be successfully transmitted to the external apparatus, a status value indicating the transmission failure (for example, "2") is stored in the transmission processing result status memory 13d. If it is determined that the image data is successfully transmitted to the external apparatus, a status value indicating the transmission success (for example, "0") is stored in the transmission processing result status memory 13d. Thus, the status value can be used in operation S15, S16 in the transmission file management processing.

As described above, according to this exemplary embodiment, the shared file storage area 13a of the MFP 1 is recognized as external storage from the PCs 31 (terminals A and B) through the LAN 200, so that external storage can be recognized and a file, etc., can be written thereinto without installing any new programs such as a driver program, a control program, etc., in the PC 31 (terminal A, B). Thus, usability is improved. Further, since the transmission file is a text file in the specific format containing the destination (i.e., the external apparatus) fax number, text file creation software included with the OS of the PC 31 (terminal A, B) can be used to easily create the transmission file. That is, an application program for creating a transmission file in the PC 31 (terminal A, B) need not be installed. Accordingly, usability is improved. For example, to transmit simple document data of several lines to an external apparatus, only the fax number of the external apparatus and the desired message text as a main body is entered, and facsimile transmission to the external apparatus is easily accomplished through the MFP 1.

By performing simple operation of creating a transmission file in accordance with the specific format in the PC 31 (terminal A, B) and storing the transmission file in the "¥PcFaxOutBox" folder in the shared file storage area 13a of the MFP 1, the facsimile function of the MFP 1 may be used to transmit image data generated based on the transmission file to an external apparatus coupled to the MFP 1 through the telephone network 100. That is, a program for using the facsimile function of the MFP 1 or a program for generating image data in the PC 31 (terminal A, B) need not be installed for the PC 31 on the same network as the MFP 1 to use the function.

Although the invention has been described based on the above-described exemplary embodiment, it is to be understood that the invention is not limited to the specific exemplary embodiment thereof described above and modifications and changes may be made without departing from the spirit and scope of the invention.

For example, the MFP 1 described above communicates with the PC 31 coupled to the LAN 200 through the LAN 200 coupled to the LAN interface 19, but the MFP 1 may be provided with a wireless LAN interface and may be coupled to a wireless access point (AP) wirelessly so as to communicate with the PC 31 coupled to the wireless access point (AP). An access point (AP) may be provided in the MFP 1 and if the PC 31 includes a wireless LAN interface, the MFP 1 may be able to communicate directly with the PC 31 wirelessly.

In the exemplary embodiment described above, the transmission file management task TK1 monitors a transmission file input to the "¥PcFaxOutBox" folder in the shared file storage area 13a of the RAM 13, but if the memory card 22a is inserted into the memory card slot 22, the transmission file stored on the memory card 22a may be monitored. That is, if data communications cannot be conducted between the MFP 1 and the PC 31 through the LAN 200, by performing simple operation of inserting the memory card 22a into the memory card slot 40 provided in the PC 31, storing a transmission file on the memory card 22a, and inserting the memory card 22a into the memory card slot 22 of the MFP 1, it is possible to transmit image data generated based on the transmission file stored on the memory card 22a to an external apparatus.

In the exemplary embodiment described above, whether a transmission file is stored from the PC 31 in the "¥PcFaxOutBox" folder stored in the checked folder path memory 12b of the ROM 12 is checked. However, alternatively, the MFP 1 may be provided with a hard disk. In such a case, a folder may be created on the hard disk, and a transmission file input to the folder in the hard disk. As another alternative, a peripheral device (e.g., an external storage) may be coupled to the MFP 1, and the peripheral device may be monitored. Likewise, a transmission file input to any folder provided in the PC 31 coupled through the LAN 200, a peripheral device (external storage) coupled to the PC 31, or storage coupled to the LAN 200 may be monitored. Further, the memory card 22*a* placed in the memory card slot 22 of the MFP 1 may be used as the shared file storage area 13*a* to monitor a folder provided in the storage area. To recognize such a memory card as the shared file storage area 13*a*, communications based on FTP (file transfer protocol) using a file system (FTP client program) usually built in the OS of the PC 31 and a file system (FTP server program) installed in the MFP 1 can be used.

A file describing a model of a transmission file or a creation procedure of a transmission file may be stored in the shared file storage area 13*a* recognized as external storage from the PC 31 (terminal A, B). In so doing, the model of the transmission file or the model of the creation procedure may be referenced the first time the transmission file is used to easily create a transmission file.

In the exemplary embodiment described above, when a command of inquiry about a shared file storage area is sent from the file system of the PC 31 (terminal A, B) to the file system of the MFP 1, the file system of the MFP 1 notifies the PC 31 of the "¥PcFaxOutBox" folder in the shared file storage area 13*a* in the RAM 13 as a folder list.

Then, the PC 31 displays the reported folder and the file name of the file stored in the folder on a display screen, as shown in FIG. 9A. A file USE METHOD.TXT indicating a creation procedure of a transmission file is previously stored in the folder first reported to the PC 31, whereby even a user who first uses the MFP 1 references the folder and thus can easily create a transmission file by referencing the file in the folder.

FIG. 9B shows an example of the file USE METHOD.TXT indicating the creation procedure of a transmission file. As shown in FIG. 9B, a method of creating a transmission file in the specific format and a procedure as to where the created file is to be input to are described in the file USE METHOD.TXT indicating the creation procedure of a transmission file. For example, the file USE METHOD.TXT that indicates the creation procedure of a transmission file may comprise the following descriptions: "Step 1: Enter the destination telephone number and a control character indicating a line feed on the first line. Step 2: Enter the main body to be transmitted on the second and later lines. If you enter a control character indicating a line feed in the beginning of a line, a line feed of the text is executed. Enter a control character indicating the end of the file in the end of the main body. Step 3: If you input the created file to "¥PcFaxOutBox," an image is transmitted." Thus, by referencing the USE METHOD.TXT file, a user can understand the method of creating a transmission file in the specific format and the place where the created file is to be input to according to the descriptions, and can input the created file to the MFP 1 and can transmit image data to an external apparatus.

Further, a model is described in the file USE METHOD.TXT indicating the creation procedure of a transmission file, so that a user can easily create a transmission file by using the model. For example, the model contains the following descriptions: "The following is an entry example for use as a model: First line:
  FAX: 052-824-XXXX
Second line: Horita Kpugyou Mr. HORITA Taro
Third line:
Fourth line: Horita Kiki HORITA Hanako
Fifth line: Apr. 1, 2007
Sixth line:
Seventh line: Thank you for your hospitality.
Eighth line: Enter text in a similar manner.
Ninth line: period."
Accordingly, the user can see the format of a transmission file at a glance by referencing the descriptions and thus can easily create a transmission file in the specific format by copying or imitating the descriptions.

In the exemplary embodiment described above, the fax number described on the first line of the transmission file is extracted, but if an abbreviated number (for example, "#1," etc.) is registered in the MFP 1, the abbreviated number may be able to be extracted. That is, if an abbreviated number is described on the first line of the transmission file, the fax number of the external apparatus corresponding to the abbreviated number is stored in the destination fax number memory 13*c*.

In the exemplary embodiment described above, if image data is normally transmitted to the external apparatus, the transmission file on which the image data is based is deleted. However, "OK_" may be prefixed to the file name of the transmission file without deleting the transmission file. Accordingly, it is possible to recognize that the transmission file has been transmitted by performing an easy operation of checking the file name of the transmission file.

In the exemplary embodiment described above, if no destination fax number is described on the first line of the transmission file, a format error is assumed to occur. However, if no destination fax number is described on the first line, image data may alternatively be transmitted to a predetermined external apparatus.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An information processing apparatus having a facsimile function of transmitting data to an external apparatus and being capable of communicating with a terminal through a network, the information processing apparatus comprising:
   a storage unit which stores file data from the terminal;
   a detection unit which detects whether the file data stored in the storage unit has specific format comprising character data and instructing information in the file data to be transmitted by the facsimile function;
   a transmission data generation unit which is configured to read the character data of the file data and generate transmission data comprising image data based on the read character data of the file data when the file data is detected as having the specific format comprising the character data which comprises destination information identifying the external apparatus, wherein the destination information is arranged at a predetermined portion of the character data;

a transmission unit which is configured to transmit the transmission data to the external apparatus identified by the destination information using the facsimile function, and a font data storage unit configured to store font data, wherein the character data comprises a character, wherein the font data comprises a character image corresponding to the character, and wherein the transmission data generation unit generates the transmission data by reading the character of the character data and referencing the character image corresponding to the read character.

2. The information processing apparatus according to claim 1, further comprising a communication unit which communicates with the terminal through the network according to a file sharing protocol or a file transfer protocol, wherein data is transferred to and from the terminal through the communication unit.

3. The information processing apparatus according to claim 1, wherein the storage unit stores a file name of a file including the file data having the specific format, the information processing apparatus further comprising a file name change unit which changes the file name of the file stored in the storage unit when transmission data fails to be transmitted to the external apparatus by the transmission unit.

4. The information processing apparatus according to claim 3, wherein, when the transmission data fails to be transmitted to the external apparatus by the transmission unit, the file name change unit changes the file name of the file stored in the storage unit to a file name indicating a reason why the transmission data failed to be transmitted.

5. The information processing apparatus according to claim 3, wherein, when the transmission data is successfully transmitted to the external apparatus by the transmission unit, the file name change unit changes the file name of the file stored in the storage unit to a file name indicating transmission completion.

6. The information processing apparatus according to claim 1, further comprising a deletion unit which deletes the file data having the specific format from the storage unit when the transmission data is successfully transmitted to the external apparatus by the transmission unit.

7. The information processing apparatus according to claim 1, wherein the storage unit stores model format information indicating the specific format so that the model format information is referenced from the terminal.

8. The information processing apparatus according to claim 1, wherein the detection unit detects whether the file data stored in the storage unit has the specific format based on a file extension of a file name of the file data periodically at a predetermined time interval.

9. An information processing apparatus having a facsimile function for transmitting data which is stored in a removable storage device by a computer separate from the information processing apparatus while the removable storage device is inserted in the computer, the information processing apparatus comprising:

a reception unit which removably receives the removable storage device;

a detection unit which detects whether the data stored in the removable storage device has a specific format comprising character data;

a transmission data generation unit which is configured to read the character data of the data and generate transmission data comprising image data to be transmitted to an external apparatus based on the data detected as being data having the specific format, wherein a predetermined portion of the character data comprises destination information identifying the external apparatus;

a transmission unit which is configured to transmit the transmission data to the external apparatus using the facsimile function; and a font data storage unit configured to store font data, wherein the character data comprises a character, wherein the font data comprises a character image corresponding to the character, and wherein the transmission data generation unit generates the transmission data by reading the character of the character data and referencing the character image corresponding to the read character.

10. A computer-readable medium having a computer program stored thereon that, when executed, performs operations comprising:

storing file data from a terminal in a storage unit;

determining whether the file data stored in the storage unit has specific format comprising character data instructing information to be transmitted by a facsimile function;

generating transmission data comprising image data based on the file data by reading the character data of the file data when the file data is determined to have the specific format and comprising destination information identifying an external apparatus, wherein the destination information is arranged at a predetermined portion of the character data;

transmitting the transmission data to the external apparatus identified by the destination information by the facsimile function; and storing font data in a font data storage unit, wherein the character data comprises a character, wherein the font data comprises a character image corresponding to the character, and wherein the step of generating transmission data comprises reading the character of the character data and referencing the character image corresponding to the read character.

11. An information processing apparatus having a facsimile function, the information processing apparatus comprising:

a monitoring unit which monitors a target location in a storage unit to find a newly stored file having a specific format comprising character data periodically at a predetermined time interval;

a reading unit which, in response to a file being found by the monitoring unit, reads a processing command comprising destination information included in a predetermined portion of the character data of the file;

a processing unit which performs processing of transmitting image data, which is generated based on the character data included in the newly stored file, to an external apparatus identified by the destination information by the facsimile function according to the processing command; and a font data storage unit configured to store font data, wherein the character data comprises a character, wherein the font data comprises a character image corresponding to the character, and wherein the image data is generated by reading the character of the character data and referencing the character image corresponding to the read character.

* * * * *